United States Patent [19]

Darlington

[11] 4,356,068

[45] Oct. 26, 1982

[54] PERMIONIC MEMBRANE

[75] Inventor: William B. Darlington, Portland, Tex.

[73] Assignee: PPG Industries, Inc., Pittsburgh, Pa.

[21] Appl. No.: 207,593

[22] Filed: Nov. 17, 1980

Related U.S. Application Data

[63] Continuation-in-part of Ser. No. 15,521, Feb. 23, 1979, Pat. No. 4,272,337.

[51] Int. Cl.$^3$ .................... C25B 1/34; C25B 13/02; C25B 13/08
[52] U.S. Cl. .................... 204/98; 204/128; 204/252; 204/283; 204/296
[58] Field of Search ............... 204/98, 128, 296, 252, 204/266, 282–283, 263

[56] References Cited

U.S. PATENT DOCUMENTS

| | | | |
|---|---|---|---|
| 4,003,818 | 1/1977 | Juillard et al. | 204/296 |
| 4,209,368 | 8/1980 | Coker et al. | 204/98 |
| 4,210,501 | 7/1980 | Dempsey et al. | 204/98 |

*Primary Examiner*—R. L. Andrews
*Attorney, Agent, or Firm*—Richard M. Goldman

[57] ABSTRACT

Disclosed is an electrolytic cell having an anode and cathode separated by and in contact with a permionic membrane. The cathodic surface of the permionic membrane is characterized by microporous channels of permionic membrane material extending from the surface into the membrane. Also disclosed is a method of electrolysis using the membrane and a method of preparing the membrane.

12 Claims, No Drawings

PERMIONIC MEMBRANE

CROSS REFERENCE TO RELATED APPLICATION

This is a continuation-in-part of my commonly assigned, copending U.S. application Ser. No. 015,521, filed Feb. 23, 1979, for SOLID POLYMER ELECTROLYTE CHLOR-ALKALI ELECTROLYSIS CELL now U.S. Pat. No. 4,272,337.

DESCRIPTION OF THE INVENTION

Electrolytic cells for the electrolysis of aqueous alkali metal chlorides, i.e., potassium chloride and sodium chloride, are characterized by the presence of an anolyte compartment with an anode therein, a catholyte compartment with a cathode therein, and a permionic membrane therebetween. The permionic membrane is a cation selective permionic membrane, impermeable to liquid and gas, but permeable to the flow of cations therethrough.

In various types of electrolytic cells, i.e., zero gap permionic membrane cells and solid polymer electrolyte electrolytic cells, either the anodic electrocatalyst or the cathodic electrocatalyst or both the anodic and cathodic electrocatalyst are in contact with the permionic membrane. That is, there is no electrolyte film between the electrocatalyst and the permionic membrane.

Zero gap permionic membranes are characterized by the electrocatalyst, i.e., either the anodic electrocatalyst or the cathodic electrocatalyst or both, being mechanically in contact with and readily removable from the respective surface of the permionic membrane. The zero gap permionic membranes are characterized by a high cathodic current efficiency relative to solid polymer electrolyte electrolytic cells.

Solid polymer electrolyte electrolytic cells are characterized by either the anodic electrocatalyst or the cathodic electrocatalyst or both being adherent to the permionic membrane, i.e., bonded to or embedded in the permionic membrane. That is, in contradistinction to the zero gap permionic membrane electrolytic cell, the electrocatalyst is only removable from the permionic membrane with either the mechanical or the chemical degradation of either the permionic membrane or the electrocatalyst or both. Solid polymer electrolyte electrolytic cells are characterized by a lower cathodic voltage than zero gap permionic membrane electrolytic cells.

It has now been found that certain advantages of zero gap permionic membranes, i.e., ease of assembly, ease of disassembly, and high cathode current efficiency, may be obtained while the lower cathodic voltages, typically associated with solid polymer electrolyte permionic cells, may also be obtained, where there are microporous channels of hydrophilic material extending from the electrocatalyst, e.g., the cathodic electrocatalyst, to the interior of the permionic membrane.

DETAILED DESCRIPTION OF THE INVENTION

Herein contemplated is an electrolytic cell having an anode, a cathode, and a permionic membrane. The anode preferably contacts the permionic membrane.

As herein contemplated, a surface of the permionic membrane, either the anodic surface thereof or the cathodic surface thereof, preferably the cathodic surface, and in a particularly preferred embodiment, both the anodic and cathodic surfaces, are characterized by microporous channels. These microporous channels extend from the electrolyte and electrocatalyst, i.e., from the external surface of the permionic membrane, to the interior of the permionic membrane. The channels, formed of permionic membrane material, are hydrophillic channels of the hydrophillic permionic membrane material.

The cathode electrocatalyst contacts the permionic membrane. It may be adherent to the permionic membrane, such as by being bonded to and embedded in the permionic membrane, that is, the cathodic electrocatalyst may only be removable from the permionic membrane by chemical or mechanical degradation or destruction of either the permionic membrane or the catalyst of both. Alternatively, and preferably, the cathodic electrocatalyst removably contacts the permionic membrane. That is, it is removable from the permionic membrane without degradation or destruction of either the catalyst or the permionic membrane or both, so that both the permionic membrane and the anodic electrocatalyst may be reused. As herein contemplated, the removable contact between the cathodic electrocatalyst and the permionic membrane is provided by establishing mechanical contact therebetween.

The electrolytic cell configuration where the cathodic electrocatalyst is adherent to the permionic membrane is characterized by a low cathode voltage, but also by a low cathode current efficiency. Where the cathodic electrocatalyst is removable from the permionic membrane, the electrolytic cell configuration is characterized by a higher cathode voltage but also by a higher cathode current efficiency relative to a solid polymer electrolyte configuration. The hydrophilic channels herein contemplated allow the cell design characterized by removable cathodic electrocatalyst to operate at low cell voltage.

Preferably the channels range from about 1 to about 200 microns in diameter, and are of tortuous, irregular geometry. The channels do not extend through the permionic membrane, in this way preserving the liquid and gas impermeability of the permionic membrane. The channels are both internal channels and external channels, that is, channels that both extend from the external surface of the permionic membrane to the interior of the permionic membrane, and that provide a degree of surface roughness to the permionic membrane. As herein contemplated, the surface or surfaces of the permionic membrane from which the channels extend are characterized by a spongy appearance when viewed under magnification, i.e., even when viewed under magnification of 8 magnification.

In order to preserve the liquid and gas impermeability of the permionic membrane, when the channels extend from one surface of the permionic membrane only they do not extend more than 80 percent of the way through the permionic membrane, while when the channels extend from both surfaces of the permionic membrane they do not extend more than slightly under one half of the way into the permionic membrane.

In a preferred exemplification contemplated herein, the channels only extend from the cathodic surface of the permionic membrane. In this exemplification the channels do not extend more than 80 percent below the undisturbed original surface of the permionic membrane, that is, less than 80 percent of the way from the undisturbed level of the cathodic surface toward the anodic surface of the permionic membrane. For example, in a permionic membrane having a thickness of 5 mils, the channels extend less than 4 mils, i.e., 100 microns, into the permionic membrane, while in a permionic membrane having a thickness of 11 mils, the channels extend less than 8.8 mils, i.e., 220 microns, into the permionic membrane. Preferably, where only one surface of the permionic membrane has pores or hydrophillic channels extending from the exterior thereof to the interior of the permionic membrane, the surface so roughened and characterized by the presence of such pores is the cathodic surface, and the cathodic electrocatalyst is in contact therewith.

According to a preferred exemplification of this invention, the permionic membrane herein contemplated is used in an electrolytic cell for the electrolysis of aqueous alkali metal chlorides. Most commonly the aqueous alkali metal chlorides electrolyzed utilizing the permionic membrane herein contemplated are potassium chloride or sodium chloride. As herein contemplated solutions, for example, saturated solutions of potassium chloride, or sodium chloride, or both, are fed to the anolyte compartment of the electrolytic cell. An electrical current is passed from the anode to the cathode whereby to evolve product at the electrodes, i.e., whereby to evolve chlorine at the anode, and hydroxyl ion with either hydrogen or water at the cathode. Chlorine and depleted brine are recovered from the anolyte compartment while alkali metal hydroxide and either hydrogen or water or both are recovered from the catholyte.

The permionic membrane used in the method of this invention may be prepared, according to a further embodiment of this invention, by depositing a leachable solid on a surface of the perionic membrane. In a preferred exemplification, the leachable solid is deposited on the intended cathodic surface. The leachable solids, either with or without a plasticizer, are hot pressed into the surface or surfaces of the permionic membrane and thereafter leached therefrom. The leachable solid materials may be fibrous or particulate. When the leachable solid materials are fibrous, they may be hydrocarbons, for example, naturally occurring hydrocarbons such as cellulosics, cotton, wool, silk and the like. Alternatively they may be synthetic fibers such as nylon, rayon, or even a synthetic polyalkyl such as polyethylene, polypropylene, polyacrylate, or polymethylmethacrylate, or the like. Preferably the fibers are from about 1 to about 200 microns in diameter, have a length of from about 1 to about 4000 microns, and are in the form of a non-woven fiber.

Alternatively, leachable material may be a particulate material, as a regular or irregular particle of silica, a carbonate, or the like.

By a leachable material is meant that the material may be removed by simple chemical treatment. Preferably the leachable material is leachable by aqueous alkali metal hydroxide, e.g., during hydrolysis of the permionic membrane from the thermoplastic form to the alkali metal salt form. Alternatively, the leachable material is leachable from the permionic membrane during the start up and electrolysis in the electrolytic cell. According to a still further exemplification, the leachable material may be burnable, for example, when the hot pressed product is exposed to air at temperatures about 150 to about 250 degrees centigrade.

The leachable material is hot pressed into the permionic membrane. Preferably the permionic membrane is in the thermoplastic form, that is, it is a low alkyl ester of the functional group, such as a methyl ester, ethyl ester, propyl ester, or butyl ester. Alternatively, it may be an acid halide such as an acid chloride, an acid fluoride, a sulfonyl chloride, a sulfonyl fluoride, a phosphorous acid chloride or a phosphorous acid fluoride.

The temperature of hot pressing is high enough to deform the membrane material, but low enough to avoid substantial thermal degradation thereof. Typically, this is in the range of about 150 to about 300 degrees centigrade and most frequently in the range of 175 to 250 degree centigrade. The pressure is high enough to deform the membrane material at the temperatures herein contemplated, but low enough to avoid destruction of the membrane or the breakthrough of leachable material to the opposite surface thereof. Typically pressures are in the range of from about 100 to 1000 pounds per square inch are used. Generally the time of hot pressing is from about 2 to about 10 minutes, although the time of hot pressing is a matter of routine experimentation which may readily be determined.

The permionic membrane interposed between the anolyte and the catholyte is fabricated of a polymeric fluorocarbon copolymer having immobile, cation selective ion exchange groups on a halocarbon backbone. The membrane may be from about 2 to about 25 mils thick, although thicker or thinner permionic membranes may be utilized. The permionic membrane may be a laminate of two or more membrane sheets. It may, additionally, have internal reinforcing fibers.

The permionic membrane may be a copolymer of (I) a fluorovinyl polyether having pendant ion exchange groups and having the formula $$CF_2=CF-O_a-[(CX'X'')_b(CFX')_c CF_2-O-(X'X'')_e(CX''X'O-CF_2)_f]-A \quad (I)$$

where a is 0 or 1, b is 0 to 6, c is 0 to 6, d is 0 to 6, e is 0 to 6, f is 0 to 6: X, X', and X'' are —H, —Cl, —F, and —(CF$_2$)$_G$CF$_3$: g is 1 to 5, [ ] is a discretionary arrangement of the moieties therein; and A is the pendant ion exchange group as will be described hereinbelow. Preferably a is 1, and X, X' amd X'' are —F and (CF$_2$)$_g$CF$_3$.

The fluorovinyl polyether may be copolymerized with a (II) fluorovinyl compound $$CF_2=CF-O_a-(CFX''_d)-A \quad (II)$$

and a (III) perfluorinated olefin $$CF_2-CXX', \quad (III)$$

or (I) may be copolymerized with only a (III) perfluorinated olefin, or (I) may be copolymerized with only a (II) perfluorovinyl compound.

The ion exchange group is a cation selective group. It may be a sulfonic group, a phosphoric group, a phosphonic group, a carboxylic group, a precursor thereof, or a reaction product thereof, e.g., an ester thereof. Carboxylic groups, precursors thereof, and reactions products thereof are preferred. Thus, as herein contemplated, A is preferably chosen from the group consisting of

—COOH,
—COOR$_1$,
—COOM,

—COF,
—COCl,
—CN,
—CONR$_2$R$_3$,
—SO$_3$H,
—SO$_3$M,
—SO$_2$F, and
—SO$_2$Cl where R$_1$ is a C$_1$ to C$_{10}$ alkyl group, R$_2$ and R$_3$ are hydrogen or C$_1$ to C$_{10}$ alkyl groups, and M is an alkali metal or a quaternary ammonium group. According to a particularly preferred exemplification, A is —COCl,
—COOH,
—COOR$_1$,
—SO$_2$F, or
—SO$_2$Cl where R$_1$ is a C$_1$ to C$_5$ alkyl.

As herein contemplated, the permionic membrane is preferably a copolymer which may have:

(I) fluorovinyl ether acid moieties derived from
$CF_2=CF-O-[CF_{2b}(CX'X'')_c(CFX')(CF_2-O-CX'X'')_e(CX'X''-O-CF_2)_f]-A$,
exemplified by
$CF_2=CFOCF_2CF(CF_3)OCF_3CF_2CF_2COOOCH_3$,

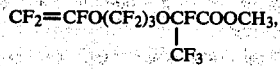

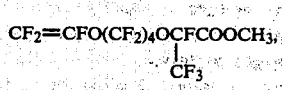

$CF_2=CFOCF_2CF(CF_3)OCF(COOCH_3)CF_3$, inter alia;
(II) fluorovinyl moieties derived from
$CF_2=CF-(O)_a-(CFX')_d-A$,
exemplified by
$CF_2-CF(CF_2)_{2-4}COOCH_3$;
$CF_2-CF(CF_2)_{2-4}COOCH_3$,
$CF_2=CFO(CF_2)_{2-4}COOCH_3$,
$CF_2=CFO(CF_2)_{2-4}COOC_2H_5$, and
$CF_2=CFO(CF_2)_{2-4}COOCH_3$, inter alia;
(III) fluorinated olefin moieties derived from
$CF_2=CXX'$ as exemplified by tetrafluoroethylene, trichlorofluoroethylene, hexafluoropropylene, trifluoroethylene, vinylidene, fluoride, and the like; and (IV) vinyl ethers derived from $CF_2=CFOR_4$ The permionic membrane herein contemplated has an ion exchange capacity of from about 0.5 to about 2.0 milliequivalents per gram of dry polymer, preferably from about 0.9 to about 1.8 milliequivalents per gram of dry polymer, and in a particularly preferred exemplification, from about 1.0 to about 1.6 milliequivalents per gram of dry polymer. The permionic membrane herein contemplated has a volumetric flow rate of 100 cubic millimeters per second at a temperature of 150 to 300 degrees centigrade, and preferably at a temperature between 160 to 250 degrees centigrade. The glass transition temperature of the permionic membrane polymer is below 70° C., and preferably below about 50° C.

The permionic membrane herein contemplated may be prepared by the methods described in U.S. Pat. No. 4,126,588, the disclosure of which is incorporated herein by reference.

Most commonly the resins will be in a thermoplastic form, i.e., a carboxylic acid ester, e.g., a carboxylic acid ester of methyl, ethyl, propyl, isopropyl, or butyl alcohol, or a sulfonyl halide, e.g., sulfonyl chloride or sulfonyl fluoride, during the fabrication herein contemplated, and will thereafter be hydrolyzed.

Typically the anodes and cathodes used in the exemplification of this invention where the electrolytic cell is a zero gap permionic membrane cell are fine screens, having from about 10 to about 30 mesh per square inch in each direction, coated with a suitable electrocatalyst such as a transition metal, for example nickel, high surface area nickel, platinum, platinum black, or the like on the cathode side, and an oxide of a transition metal, for example an oxide of a platinum group metal, or an oxide of a platinum group metal with an oxide of a film forming metal on the anode side, for example ruthenium dioxide with titanium dioxide.

According to a particularly preferred exemplification of the invention herein contemplated, a 7 to 12 mil thick sheet of Asahi Glass Co., Ltd. FLEMION ® type HB permionic membrane material is placed in a hot press with one surface thereof having non-woven, 20 micron diameter rayon thereon. Atop the rayon and below the bottom surface of the membrane are films of aluminum, whereby to prevent adhesion of the organic material to the hot press. The membrane is hot pressed at a temperature of from about 170 to 225 degrees centigrade, and a pressure of about 150 to 225 pounds per square inch for about 5 to 7 minutes whereby to provide a permionic membrane having leachable material on the surface thereof. Thereafter, the permionic membrane is hydrolyzed in 25 percent aqueous sodium hydroxide for about 25 hours at about 90 degrees centigrade. During the hydrolysis, which converts the methyl ester form of the permionic membrane to the sodium salt, the leachable, non-woven fabric is destroyed. In this way there is provide a spongy appearing surface. Thereafter, the hydrolyzed permionic membrane is placed between a 20 mesh per inch by 20 mesh per inch platinum black coated nickel cathode and a 20 mesh per inch by 20 mesh per inch ruthenium dioxide-titanium dioxide coated titanium screen substrate and assembled into an electrolytic cell. Electrolysis is commenced with chlorine being evolved at the anode and hydroxyl ion and hydrogen being evolved at the cathode.

The following example is illustrative.

EXAMPLE

A zero-gap permionic membrane electrolytic cell was assembled having the cathode bearing upon a cathodic, microporous surface of the permionic membrane, and the anode bearing upon the anodic, opposite surface of the permionic membrane.

A 3 inch by 3 inch by 11 mil thick sheet of Asahi Glass Co., Ltd. FLEMION ® Type HB cation selective permionic membrane, formed of a fluorocarbon copolymer having pendant methyl carboxylate groups had two sheets of 48 grams per square yard non-woven rayon fabric laid upon the cathodic surface. The three sheets, i.e., the two sheets of rayon and one sheet of membrane, were subjected to hot pressing at 140 pounds per square inch and 225 degrees centigrade for 5 minutes.

After hot pressing the membrane was immersed in 25 weight percent sodium hydroxide at 90 degrees centigrade for 24 hours. The resulting membrane appeared rough and colorless and had a resistivity of approximately 3000 ohm-centimeters.

Thereafter the membrane was installed in a laboratory zero gap permionic cell having a platinum-plated nickel screen cathode and a ruthenium dioxide-coated titanium screen anode. The electrolytic cell had a cell voltage of 3.31 volts at a current density of 200 Amperes per square foot.

While the invention has been described with respect to certain preferred exemplifications and embodiments thereof, the scope of protection is not intended to be limited thereby, but only by the claims appended hereto.

I claim:

1. In a method of conducting electrolysis in an electrolytic cell having an anolyte compartment with an anode therein, a catholyte compartment with a cathode therein, and an electrolyte impermeable, cation selective, permionic membrane therebetween, said cathode being in contact with the permionic membrane, which method comprises feeding alkali metal chloride brine to the anolyte compartment, passing an electrical current from the anode to the cathode, evolving chlorine at the anode and hydroxyl ion at the cathode, the improvement wherein the anodic surface of the permionic membrane is an imporous surface, the cathodic surface of the permionic membrane comprises microporous channels of permionic membrane material within the cation selective permionic membrane, and wherein said microporous channels are prepared by the process comprising:
   a. hot pressing a leachable solid in and on the cathodic surface of the permionic membrane; and
   b. leaching out the leachable solid.

2. The method of claim 1 wherein the leachable solid is a fibrous material.

3. The method of claim 2 wherein the fibrous material is a leachable hydrocarbon fiber.

4. The method of claim 1 wherein the leachable solid is a particulate material.

5. The method of claim 4 wherein the leachable solid is an inorganic material.

6. The method of claim 1 wherein the leachable material is deposited into the surface of the permionic membrane by hot pressing while the permionic resin material is in a thermoplastic form, and the leachable material is leached out when the permionic membrane is hydrolyzed to an alkali metal salt.

7. A permionic membrane electrolytic cell having an anode in contact with an anodic surface of the permionic membrane and a cathode in contact with a cathodic surface of the permionic membrane, the permionic membrane being electrolyte impermeable, the anodic surface of the permionic membrane being imporous, the cathodic surface of the permionic membrane comprising microporous channels of permionic membrane material within the permionic membrane, wherein said microporous channels are prepared by the process comprising:
   a. hot pressing a leachable solid in and on the cathodic surface of the permionic membrane; and
   b. leaching out the leachable solid.

8. The electrolytic cell of claim 1 wherein the leachable solid is a fibrous material.

9. The electrolytic cell of claim 8 wherein the fibrous material is a leachable hydrocarbon fiber.

10. The electrolytic cell of claim 1 wherein the leachable material is a particulate material.

11. The electrolytic cell of claim 10 wherein particulate material is a leachable inorganic material.

12. The electrolytic cell of claim 1 wherein the leachable material is deposited into the surface of the permionic membrane by hot pressing while the permionic membrane material is in a thermoplastic form, and the leachable material is leached out when the permionic membrane is hydrolyzed to an alkali metal salt.

* * * * *